(12) United States Patent
McClellan (10) Patent No.: US 8,892,341 B2
(45) Date of Patent: Nov. 18, 2014

(54) DRIVER MENTORING TO IMPROVE VEHICLE OPERATION

(75) Inventor: Scott McClellan, Heber, UT (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 1123 days.

(21) Appl. No.: 12/379,155

(22) Filed: Feb. 13, 2009

(65) Prior Publication Data

US 2010/0211259 A1 Aug. 19, 2010

(51) Int. Cl.
*G06F 19/00* (2011.01)
*G09B 19/16* (2006.01)
*B60R 16/023* (2006.01)

(52) U.S. Cl.
CPC .......... *C07C 5/0816* (2013.01); *B60R 16/0236* (2013.01); *G09B 19/16* (2013.01); *G09B 19/167* (2013.01)
USPC ......... 701/115; 701/123; 701/32.7; 701/33.2; 701/33.4

(58) Field of Classification Search
CPC ..... F02B 77/083; F02B 77/084; G07C 5/004; G07C 5/006; G07C 5/08; G07C 5/0808; G07C 5/0816; G07C 5/0825; G07C 5/0833; G07C 5/0841; G07C 5/085; G07C 5/0858; G07C 5/0866; G07C 5/0875; G07C 5/0883; G07C 5/0891; G07C 5/10; G07C 5/12; B60R 16/0236; G09B 19/167
USPC ............ 701/1, 29, 33, 36, 99, 115, 123, 31.4, 701/32.1, 32.7, 33.2, 33.4, 34.2, 34.4, 29.1, 701/29.4, 29.5; 340/439
See application file for complete search history.

(56) References Cited

U.S. PATENT DOCUMENTS

| | | |
|---|---|---|
| 3,975,708 A | 8/1976 | Lusk |
| 4,419,654 A | 12/1983 | Funk |
| 4,458,535 A | 7/1984 | Juergens |
| 4,785,280 A | 11/1988 | Fubini |
| 4,926,417 A | 5/1990 | Futami |
| 4,939,652 A | 7/1990 | Steiner |

(Continued)

FOREIGN PATENT DOCUMENTS

| | | | |
|---|---|---|---|
| CA | 2071931 | 12/1993 | |
| DE | 197 00 353 A1 | 7/1998 | ............ B60K 28/00 |

(Continued)

OTHER PUBLICATIONS

International Search Report, Apr. 9, 2010, WIPO.

(Continued)

*Primary Examiner* — Jerrah Edwards
(74) *Attorney, Agent, or Firm* — Workman Nydegger (57) ABSTRACT

A system and method for mentoring a driver of a vehicle can include a monitoring device in communication with an onboard diagnostics unit coupled to an engine, the monitoring device monitoring at least one of a plurality of vehicle parameters received from the onboard diagnostics unit including vehicle speed, fuel level, engine speed, load, mass air flow, manifold air pressure, and odometer reading, and using the at least one of a plurality of vehicle parameters to calculate a fuel efficiency and/or emissions of the engine; and an output coupled to the monitoring device, wherein the output notifies the driver when the fuel efficiency changes. The output can notify the driver when the fuel efficiency and/or emissions increases or decreases. The notification can be visual, audible, or a combination of the two.

19 Claims, 3 Drawing Sheets

(56) References Cited

U.S. PATENT DOCUMENTS

| Patent | Kind | Date | Name | Ref |
|---|---|---|---|---|
| 5,032,821 | A | 7/1991 | Domanico | |
| 5,303,163 | A | 4/1994 | Ebaugh et al. | 364/550 |
| 5,305,214 | A | 4/1994 | Komatsu | |
| 5,309,139 | A | 5/1994 | Austin | |
| 5,325,082 | A | 6/1994 | Rodriguez | |
| 5,347,260 | A | 9/1994 | Ginzel | |
| 5,359,528 | A | 10/1994 | Haendel | |
| 5,365,114 | A | 11/1994 | Tsurushima | |
| 5,394,136 | A | 2/1995 | Lammers | |
| 5,400,018 | A | 3/1995 | Scholl | |
| 5,422,624 | A | 6/1995 | Smith | |
| 5,424,584 | A | 6/1995 | Matsuda | |
| 5,430,432 | A | 7/1995 | Camhi | |
| 5,436,612 | A | 7/1995 | Aduddell | |
| 5,436,837 | A | 7/1995 | Gerstung | |
| 5,446,659 | A | 8/1995 | Yamawaki | |
| 5,453,939 | A | 9/1995 | Hoffman | |
| 5,457,439 | A | 10/1995 | Kuhn | |
| 5,475,597 | A | 12/1995 | Buck | |
| 5,485,161 | A | 1/1996 | Vaughn | |
| 5,499,182 | A | 3/1996 | Ousborne | |
| 5,521,579 | A | 5/1996 | Bernhard | |
| 5,521,580 | A | 5/1996 | Kaneko | |
| 5,525,960 | A | 6/1996 | McCall | |
| 5,548,273 | A | 8/1996 | Nicol | |
| 5,581,464 | A | 12/1996 | Woll | |
| 5,586,130 | A | 12/1996 | Doyle | |
| 5,600,558 | A | 2/1997 | Mearek | |
| 5,612,875 | A | 3/1997 | Haendel | |
| 5,625,337 | A | 4/1997 | Medawar | |
| 5,642,284 | A | 6/1997 | Parupalli | |
| 5,648,755 | A | 7/1997 | Yagihashi | |
| 5,659,289 | A | 8/1997 | Zonkoski | |
| 5,689,067 | A | 11/1997 | Klein | |
| 5,708,417 | A | 1/1998 | Tallman | |
| 5,717,374 | A | 2/1998 | Smith | |
| 5,719,771 | A | 2/1998 | Buck | |
| 5,723,768 | A | 3/1998 | Ammon | |
| 5,740,548 | A | 4/1998 | Hudgens | |
| 5,742,915 | A | 4/1998 | Stafford | |
| 5,758,299 | A * | 5/1998 | Sandborg et al. | 701/33.7 |
| 5,764,139 | A | 6/1998 | Nojima | |
| 5,767,767 | A | 6/1998 | Lima | |
| 5,795,997 | A | 8/1998 | Gittins | |
| 5,797,134 | A | 8/1998 | McMillan | |
| 5,801,618 | A | 9/1998 | Jenkins | |
| 5,801,948 | A | 9/1998 | Wood | |
| 5,825,283 | A | 10/1998 | Camhi | |
| 5,825,284 | A | 10/1998 | Dunwoody | |
| 5,844,475 | A | 12/1998 | Horie | |
| 5,847,271 | A | 12/1998 | Poublon | |
| 5,862,500 | A | 1/1999 | Goodwin | |
| 5,867,093 | A | 2/1999 | Dodd | |
| 5,877,678 | A | 3/1999 | Donoho | |
| 5,880,674 | A | 3/1999 | Ufkes | |
| 5,892,434 | A | 4/1999 | Carlson | |
| 5,907,277 | A | 5/1999 | Tokunaga | |
| 5,914,654 | A | 6/1999 | Smith | |
| 5,926,087 | A | 7/1999 | Busch | |
| 5,941,915 | A | 8/1999 | Federle et al. | 701/1 |
| 5,945,919 | A | 8/1999 | Trask | |
| 5,949,330 | A | 9/1999 | Hoffman | |
| 5,949,331 | A | 9/1999 | Schofield | |
| 5,954,781 | A | 9/1999 | Slepian | |
| 5,955,942 | A | 9/1999 | Slifkin | |
| 5,957,986 | A | 9/1999 | Coverdill | |
| 5,964,816 | A | 10/1999 | Kincaid | |
| 5,969,600 | A | 10/1999 | Tanguay | |
| 5,978,737 | A | 11/1999 | Pawlowski | |
| 5,982,278 | A | 11/1999 | Cuvelier | |
| 5,987,976 | A | 11/1999 | Sarangapani | |
| 6,002,327 | A | 12/1999 | Boesch | |
| 6,008,724 | A | 12/1999 | Thompson | |
| 6,018,293 | A | 1/2000 | Smith | |
| 6,028,508 | A | 2/2000 | Mason | |
| 6,028,510 | A | 2/2000 | Tamam | |
| 6,037,861 | A | 3/2000 | Ying | |
| 6,037,862 | A | 3/2000 | Ying | |
| 6,038,496 | A | 3/2000 | Dobler | |
| 6,044,315 | A | 3/2000 | Honeck | |
| 6,059,066 | A | 5/2000 | Lary | |
| 6,064,928 | A | 5/2000 | Wilson | |
| 6,064,970 | A | 5/2000 | McMillan | |
| 6,067,008 | A | 5/2000 | Smith | |
| 6,067,009 | A | 5/2000 | Hozuka | |
| 6,072,388 | A | 6/2000 | Kyrtsos | |
| 6,078,853 | A | 6/2000 | Ebner | |
| 6,081,188 | A | 6/2000 | Kutlucinar | |
| 6,094,149 | A | 7/2000 | Wilson | |
| 6,098,048 | A | 8/2000 | Dashefsky | |
| 6,100,792 | A | 8/2000 | Ogino | |
| 6,104,282 | A | 8/2000 | Fragoso | |
| 6,108,591 | A | 8/2000 | Segal et al. | 701/1 |
| 6,130,608 | A | 10/2000 | McKeown | |
| 6,133,827 | A | 10/2000 | Alvey | |
| 6,141,610 | A | 10/2000 | Rothert | |
| 6,147,598 | A | 11/2000 | Murphy | |
| 6,172,602 | B1 | 1/2001 | Hasfjord | |
| 6,178,374 | B1 | 1/2001 | Möhlenkamp et al. | 701/117 |
| 6,184,784 | B1 | 2/2001 | Shibuya | |
| 6,185,501 | B1 | 2/2001 | Smith | |
| 6,198,995 | B1 | 3/2001 | Settles | |
| 6,204,756 | B1 | 3/2001 | Senyk | |
| 6,204,757 | B1 | 3/2001 | Evans | |
| 6,208,240 | B1 | 3/2001 | Ledesma | |
| 6,212,455 | B1 | 4/2001 | Weaver | |
| 6,216,066 | B1 | 4/2001 | Goebel | |
| 6,225,898 | B1 | 5/2001 | Kamiya | |
| 6,227,862 | B1 | 5/2001 | Harkness | |
| 6,229,438 | B1 | 5/2001 | Kutlucinar | |
| 6,232,873 | B1 | 5/2001 | Dilz | |
| 6,246,933 | B1 | 6/2001 | Bague | |
| 6,247,360 | B1 | 6/2001 | Anderson | |
| 6,249,219 | B1 | 6/2001 | Perez | |
| 6,253,129 | B1 | 6/2001 | Jenkins | |
| 6,255,892 | B1 | 7/2001 | Gartner | |
| 6,255,939 | B1 | 7/2001 | Roth | |
| 6,262,658 | B1 | 7/2001 | O'Connor | |
| 6,265,989 | B1 | 7/2001 | Taylor | |
| 6,266,588 | B1 | 7/2001 | McClellan | |
| 6,278,361 | B1 | 8/2001 | Magiawala | |
| 6,285,931 | B1 | 9/2001 | Hattori | |
| 6,289,332 | B2 | 9/2001 | Menig | |
| 6,294,988 | B1 | 9/2001 | Shomura | |
| 6,294,989 | B1 | 9/2001 | Schofield | |
| 6,295,492 | B1 | 9/2001 | Lang | |
| 6,301,533 | B1 | 10/2001 | Markow | |
| 6,306,063 | B1 | 10/2001 | Horgan et al. | 477/108 |
| 6,308,120 | B1 | 10/2001 | Good | |
| 6,313,742 | B1 | 11/2001 | Larson | |
| 6,320,497 | B1 | 11/2001 | Fukumoto | |
| 6,333,686 | B1 | 12/2001 | Waltzer | |
| 6,337,653 | B1 | 1/2002 | Bchler | |
| 6,339,739 | B1 | 1/2002 | Folke | |
| 6,339,745 | B1 | 1/2002 | Novik | 701/208 |
| 6,344,805 | B1 | 2/2002 | Yasui | |
| 6,351,211 | B1 | 2/2002 | Bussard | |
| 6,356,188 | B1 | 3/2002 | Meyers | |
| 6,356,822 | B1 | 3/2002 | Diaz | |
| 6,356,833 | B2 | 3/2002 | Jeon | |
| 6,356,836 | B1 | 3/2002 | Adolph | 701/208 |
| 6,359,554 | B1 | 3/2002 | Skibinski | |
| 6,362,730 | B2 | 3/2002 | Razavi | |
| 6,362,734 | B1 | 3/2002 | McQuade | |
| 6,366,199 | B1 | 4/2002 | Osborn | |
| 6,378,959 | B2 | 4/2002 | Lesesky | |
| 6,389,340 | B1 | 5/2002 | Rayner | |
| 6,393,348 | B1 | 5/2002 | Ziegler | |
| 6,404,329 | B1 | 6/2002 | Hsu | |
| 6,405,112 | B1 | 6/2002 | Rayner | |
| 6,405,128 | B1 | 6/2002 | Bechtolsheim et al. | 701/208 |
| 6,415,226 | B1 | 7/2002 | Kozak | 701/210 |
| 6,424,268 | B1 | 7/2002 | Isonaga | |
| 6,427,687 | B1 | 8/2002 | Kirk | |

(56) References Cited

U.S. PATENT DOCUMENTS

| | | |
|---|---|---|
| 6,430,488 B1 | 8/2002 | Goldman |
| 6,433,681 B1 | 8/2002 | Foo |
| 6,441,732 B1 | 8/2002 | Laitsaari |
| 6,449,540 B1 | 9/2002 | Rayner |
| 6,459,367 B1 | 10/2002 | Green |
| 6,459,369 B1 | 10/2002 | Wang |
| 6,459,961 B1 | 10/2002 | Obradovich |
| 6,459,969 B1 | 10/2002 | Bates |
| 6,462,675 B1 | 10/2002 | Humphrey |
| 6,472,979 B2 | 10/2002 | Schofield |
| 6,480,106 B1 | 11/2002 | Crombez |
| 6,484,091 B2 | 11/2002 | Shibata |
| 6,493,650 B1 | 12/2002 | Rodgers |
| 6,512,969 B1 | 1/2003 | Wang |
| 6,515,596 B2 | 2/2003 | Awada |
| 6,519,512 B1 | 2/2003 | Haas |
| 6,525,672 B2 | 2/2003 | Chainer |
| 6,535,116 B1 | 3/2003 | Zhou |
| 6,542,074 B1 | 4/2003 | Tharman |
| 6,542,794 B2 | 4/2003 | Obradovich |
| 6,549,834 B2 | 4/2003 | McClellan |
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,609,063 B1 | 8/2003 | Bender et al. ................ 701/209 |
| 6,609,064 B1 | 8/2003 | Dean ................ 701/213 |
| 6,611,740 B2 | 8/2003 | Lowrey |
| 6,611,755 B1 | 8/2003 | Coffee |
| 6,622,085 B2 | 9/2003 | Amita et al. ................ 701/208 |
| 6,629,029 B1 | 9/2003 | Giles |
| 6,630,884 B1 | 10/2003 | Shanmugham |
| 6,631,322 B1 | 10/2003 | Arthur et al. ................ 701/211 |
| 6,636,790 B1 | 10/2003 | Lightner |
| 6,639,512 B1 | 10/2003 | Lee |
| 6,643,578 B2 | 11/2003 | Levine |
| 6,651,001 B2 | 11/2003 | Apsell |
| 6,657,540 B2 | 12/2003 | Knapp |
| 6,662,141 B2 | 12/2003 | Kaub ................ 702/181 |
| 6,665,613 B2 | 12/2003 | Duvall |
| 6,674,362 B2 | 1/2004 | Yoshioka |
| 6,675,085 B2 | 1/2004 | Straub |
| 6,677,854 B2 | 1/2004 | Dix |
| 6,678,612 B1 | 1/2004 | Khawam |
| 6,696,932 B2 | 2/2004 | Skibinski |
| 6,703,925 B2 | 3/2004 | Steffel |
| 6,714,894 B1 | 3/2004 | Tobey et al. ................ 702/188 |
| 6,718,235 B1 | 4/2004 | Borugian |
| 6,718,239 B2 | 4/2004 | Rayner |
| 6,727,809 B1 | 4/2004 | Smith |
| 6,728,605 B2 | 4/2004 | Lash |
| 6,732,031 B1 | 5/2004 | Lightner |
| 6,732,032 B1 | 5/2004 | Banet |
| 6,737,962 B2 | 5/2004 | Mayor |
| 6,741,169 B2 | 5/2004 | Magiawala |
| 6,741,170 B2 | 5/2004 | Alrabady |
| 6,745,153 B2 | 6/2004 | White |
| 6,748,322 B1 | 6/2004 | Fernandez |
| 6,750,761 B1 | 6/2004 | Newman |
| 6,750,762 B1 | 6/2004 | Porter |
| 6,756,916 B2 | 6/2004 | Yanai |
| 6,759,952 B2 | 7/2004 | Dunbridge |
| 6,766,244 B2 | 7/2004 | Obata et al. ................ 701/207 |
| 6,775,602 B2 | 8/2004 | Gordon |
| 6,784,793 B2 | 8/2004 | Gagnon |
| 6,788,196 B2 | 9/2004 | Ueda |
| 6,788,207 B2 | 9/2004 | Wilkerson |
| 6,792,339 B2 | 9/2004 | Basson |
| 6,798,354 B2 | 9/2004 | Schuessler |
| 6,807,481 B1 | 10/2004 | Gastelum |
| 6,813,549 B2 | 11/2004 | Good |
| 6,819,236 B2 | 11/2004 | Kawai |
| 6,832,141 B2 | 12/2004 | Skeen |
| 6,845,314 B2 | 1/2005 | Fosseen |
| 6,845,316 B2 | 1/2005 | Yates ................ 701/117 |
| 6,845,317 B2 | 1/2005 | Craine |
| 6,847,871 B2 | 1/2005 | Malik et al. ................ 701/33 |
| 6,847,872 B2 | 1/2005 | Bodin |
| 6,847,873 B1 | 1/2005 | Li |
| 6,847,887 B1 | 1/2005 | Casino ................ 701/208 |
| 6,850,841 B1 | 2/2005 | Casino ................ 701/208 |
| 6,859,039 B2 | 2/2005 | Horie |
| 6,859,695 B2 | 2/2005 | Klausner |
| 6,865,457 B1 | 3/2005 | Mittelsteadt |
| 6,868,386 B1 | 3/2005 | Henderson |
| 6,870,469 B2 | 3/2005 | Ueda |
| 6,873,253 B2 | 3/2005 | Veziris |
| 6,873,261 B2 | 3/2005 | Anthony |
| 6,879,894 B1 | 4/2005 | Lightner |
| 6,885,293 B2 | 4/2005 | Okumura |
| 6,892,131 B2 | 5/2005 | Coffee |
| 6,894,606 B2 | 5/2005 | Forbes et al. ................ 340/435 |
| 6,895,332 B2 | 5/2005 | King |
| 6,914,523 B2 | 7/2005 | Munch |
| 6,922,616 B2 | 7/2005 | Obradovich |
| 6,922,622 B2 | 7/2005 | Dulin |
| 6,925,425 B2 | 8/2005 | Remboski |
| 6,928,348 B1 | 8/2005 | Lightner |
| 6,937,162 B2 | 8/2005 | Tokitsu |
| 6,950,013 B2 | 9/2005 | Scaman |
| 6,954,140 B2 | 10/2005 | Holler |
| 6,958,976 B2 | 10/2005 | Kikkawa |
| 6,965,827 B1 | 11/2005 | Wolfson ................ 701/207 |
| 6,970,075 B2 | 11/2005 | Cherouny |
| 6,972,669 B2 | 12/2005 | Saito |
| 6,982,636 B1 | 1/2006 | Bennie |
| 6,983,200 B2 | 1/2006 | Bodin |
| 6,988,033 B1 | 1/2006 | Lowrey |
| 6,988,034 B1 | 1/2006 | Marlatt et al. ................ 701/200 |
| 6,989,739 B2 | 1/2006 | Li |
| 7,002,454 B1 | 2/2006 | Gustafson |
| 7,005,975 B2 | 2/2006 | Lehner |
| 7,019,641 B2 | 3/2006 | Lakshmanan |
| 7,023,332 B2 | 4/2006 | Saito |
| 7,024,318 B2 | 4/2006 | Fischer |
| 7,034,705 B2 | 4/2006 | Yoshioka |
| 7,038,578 B2 | 5/2006 | Will |
| 7,042,347 B2 | 5/2006 | Cherouny |
| 7,047,114 B1 | 5/2006 | Rogers |
| 7,049,941 B2 | 5/2006 | Rivera-Cintron |
| 7,054,742 B2 | 5/2006 | Khavakh et al. ................ 701/209 |
| 7,059,689 B2 | 6/2006 | Lesesky |
| 7,069,126 B2 | 6/2006 | Bernard |
| 7,069,134 B2 | 6/2006 | Williams |
| 7,072,753 B2 | 7/2006 | Eberle |
| 7,081,811 B2 | 7/2006 | Johnston |
| 7,084,755 B1 | 8/2006 | Nord |
| 7,088,225 B2 | 8/2006 | Yoshioka |
| 7,089,116 B2 | 8/2006 | Smith |
| 7,091,880 B2 | 8/2006 | Sorensen |
| 7,098,812 B2 | 8/2006 | Hirota |
| 7,099,750 B2 | 8/2006 | Miyazawa |
| 7,099,774 B2 | 8/2006 | King |
| 7,102,496 B1 | 9/2006 | Ernst |
| 7,109,853 B1 | 9/2006 | Mattson |
| 7,113,081 B1 | 9/2006 | Reichow |
| 7,113,107 B2 | 9/2006 | Taylor |
| 7,117,075 B1 | 10/2006 | Larschan |
| 7,119,696 B2 | 10/2006 | Borugian |
| 7,124,027 B1 | 10/2006 | Ernst |
| 7,129,825 B2 | 10/2006 | Weber |
| 7,132,934 B2 | 11/2006 | Allison |
| 7,132,937 B2 | 11/2006 | Lu |
| 7,132,938 B2 | 11/2006 | Suzuki |
| 7,133,755 B2 | 11/2006 | Salman |
| 7,135,983 B2 | 11/2006 | Filippov |
| 7,138,916 B2 | 11/2006 | Schwartz |
| 7,139,661 B2 | 11/2006 | Holze |

(56) References Cited

U.S. PATENT DOCUMENTS

| | | |
|---|---|---|
| 7,145,442 B1 | 12/2006 | Wai |
| 7,149,206 B2 | 12/2006 | Pruzan |
| 7,155,321 B2 | 12/2006 | Bromley et al. ............... 701/29 |
| 7,161,473 B2 | 1/2007 | Hoshal |
| 7,164,986 B2 | 1/2007 | Humphries |
| 7,170,390 B2 | 1/2007 | Quiñones |
| 7,170,400 B2 | 1/2007 | Cowelchuk |
| 7,174,243 B1 | 2/2007 | Lightner |
| 7,180,407 B1 | 2/2007 | Guo |
| 7,180,409 B2 | 2/2007 | Brey |
| 7,187,271 B2 | 3/2007 | Nagata |
| 7,196,629 B2 | 3/2007 | Ruoss |
| 7,197,500 B1 | 3/2007 | Israni et al. .................... 707/100 |
| 7,216,022 B2 | 5/2007 | Kynast et al. .................... 701/1 |
| 7,216,035 B2 | 5/2007 | Hörtner |
| 7,218,211 B2 | 5/2007 | Ho |
| 7,218,924 B2 | 5/2007 | McArdle |
| 7,222,009 B2 | 5/2007 | Hijikata |
| 7,225,065 B1 | 5/2007 | Hunt |
| 7,228,211 B1 | 6/2007 | Lowrey |
| 7,233,235 B2 | 6/2007 | Pavlish |
| 7,236,862 B2 | 6/2007 | Kanno |
| 7,239,948 B2 | 7/2007 | Nimmo |
| 7,256,686 B2 | 8/2007 | Koutsky |
| 7,256,700 B1 | 8/2007 | Ruocco |
| 7,256,702 B2 | 8/2007 | Isaacs |
| 7,260,497 B2 | 8/2007 | Watabe |
| RE39,845 E | 9/2007 | Hasfjord |
| 7,269,507 B2 | 9/2007 | Cayford ................... 701/208 |
| 7,269,530 B1 | 9/2007 | Lin |
| 7,271,716 B2 | 9/2007 | Nou |
| 7,273,172 B2 | 9/2007 | Olsen |
| 7,280,046 B2 | 10/2007 | Berg |
| 7,283,904 B2 | 10/2007 | Benjamin |
| 7,286,917 B2 | 10/2007 | Hawkins |
| 7,286,929 B2 | 10/2007 | Staton |
| 7,289,024 B2 | 10/2007 | Sumcad |
| 7,289,035 B2 | 10/2007 | Nathan |
| 7,292,152 B2 | 11/2007 | Torkkola |
| 7,292,159 B2 | 11/2007 | Culpepper |
| 7,298,248 B2 | 11/2007 | Finley |
| 7,298,249 B2 | 11/2007 | Avery |
| 7,301,445 B2 | 11/2007 | Moughler |
| 7,317,383 B2 | 1/2008 | Ihara |
| 7,317,392 B2 | 1/2008 | DuRocher |
| 7,317,927 B2 | 1/2008 | Staton |
| 7,319,848 B2 | 1/2008 | Obradovich |
| 7,321,294 B2 | 1/2008 | Mizumaki |
| 7,321,825 B2 | 1/2008 | Ranalli |
| 7,323,972 B2 | 1/2008 | Nobusawa |
| 7,323,974 B2 | 1/2008 | Schmid |
| 7,323,982 B2 | 1/2008 | Staton |
| 7,327,239 B2 | 2/2008 | Gallant |
| 7,327,258 B2 | 2/2008 | Fast |
| 7,333,883 B2 | 2/2008 | Geborek |
| 7,339,460 B2 | 3/2008 | Lane |
| 7,349,782 B2 | 3/2008 | Churchill |
| 7,352,081 B2 | 4/2008 | Taurasi |
| 7,355,508 B2 | 4/2008 | Mian |
| 7,365,639 B2 | 4/2008 | Yuhara |
| 7,366,551 B1 | 4/2008 | Hartley |
| 7,375,624 B2 | 5/2008 | Hines |
| 7,376,499 B2 | 5/2008 | Salman |
| 7,378,946 B2 | 5/2008 | Lahr |
| 7,378,949 B2 | 5/2008 | Chen |
| 7,386,394 B2 | 6/2008 | Shulman |
| 7,421,334 B2 | 9/2008 | Dahlgren et al. ............. 701/117 |
| 7,433,889 B1 | 10/2008 | Barton ........................ 707/104.1 |
| 7,447,509 B2 | 11/2008 | Cossins et al. ................ 455/457 |
| 7,499,949 B2 | 3/2009 | Barton ........................ 707/104.1 |
| 7,565,230 B2 | 7/2009 | Gardner et al. .................. 701/35 |
| 7,798,578 B2* | 9/2010 | Lewis et al. .................... 303/151 |
| 7,880,642 B2 | 2/2011 | Gueziec ........................ 340/905 |
| 7,898,388 B2 | 3/2011 | Ehrman et al. ................. 340/5.8 |
| 7,941,258 B1 | 5/2011 | Mittelsteadt et al. ........... 701/35 |
| 8,224,560 B2* | 7/2012 | Motonaga et al. ............. 701/123 |
| 2001/0018628 A1 | 8/2001 | Jenkins et al. .................. 701/35 |
| 2002/0024444 A1 | 2/2002 | Hiyama et al. ................ 340/576 |
| 2004/0077339 A1 | 4/2004 | Martens |
| 2004/0124971 A1* | 7/2004 | MacTavish et al. ........ 340/425.5 |
| 2004/0142672 A1 | 7/2004 | Stankewitz |
| 2004/0210353 A1 | 10/2004 | Rice ................................. 701/1 |
| 2004/0236474 A1 | 11/2004 | Chowdhary et al. .............. 701/1 |
| 2005/0021222 A1 | 1/2005 | Minami et al. |
| 2005/0064835 A1 | 3/2005 | Gusler |
| 2005/0137757 A1 | 6/2005 | Phelan et al. ..................... 701/1 |
| 2006/0154687 A1 | 7/2006 | McDowell |
| 2007/0229234 A1 | 10/2007 | Smith |
| 2007/0276582 A1* | 11/2007 | Coughlin ..................... 701/123 |
| 2007/0293206 A1 | 12/2007 | Lund |
| 2008/0064413 A1 | 3/2008 | Breed |
| 2008/0243558 A1* | 10/2008 | Gupte .............................. 705/4 |
| 2008/0255722 A1 | 10/2008 | McClellan et al. |
| 2008/0255888 A1 | 10/2008 | Berkobin |
| 2008/0270519 A1 | 10/2008 | Ekdahl et al. |
| 2008/0297335 A1* | 12/2008 | Yeh et al. ...................... 340/439 |
| 2008/0319602 A1 | 12/2008 | McClellan et al. |
| 2009/0040033 A1 | 2/2009 | Uchida |
| 2010/0145569 A1* | 6/2010 | Bourque et al. ................. 701/33 |

FOREIGN PATENT DOCUMENTS

| | | |
|---|---|---|
| JP | 2007235530 | 9/2007 |
| WO | WO2005109369 | 11/2005 |
| WO | WO2008109477 | 9/2008 |

OTHER PUBLICATIONS

Ogle, et al.; *Accuracy of Global Positioning System for Determining Driver Performance Parameters*; Transportation Research Record 1818; Paper No. 02-1063; pp. 12-24.

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

* cited by examiner

DRIVER MENTORING TO IMPROVE VEHICLE OPERATION

This application relates to U.S. patent application Ser. No. 11/860,594, filed on Sep. 25, 2007, entitled "System and Method for Reconfiguring an Electronic Control Unit of a Motor Vehicle to Optimize Fuel Economy", which claims the benefit of U.S. Provisional Application No. 60/848,681, filed on Oct. 2, 2006, entitled "System and Method for Reconfiguring an Electronic Control Unit of a Motor Vehicle to Optimize Fuel Economy," each of which is incorporated herein by reference in its entirety for all purposes.

TECHNICAL FIELD

The present invention relates generally to driver mentoring to improve vehicle operation.

BACKGROUND

Modern vehicles provide a variety of information to vehicle operators including instantaneous fuel efficiency, average fuel efficiency, the number of miles that can be traveled with the remaining gas, and the like. However, this information does not provide any feedback to the vehicle operator that would assist in improving vehicle operation.

Further, modern vehicles do not provide any feedback to assist drivers in reducing usage or extending the useful lifetime of other vehicle consumables, such as, for example, oil, antifreeze, batteries, brakes, and the like.

There is a need to provide vehicle operator mentoring to improve performance. Such mentoring could assist drivers, for example, in reducing vehicle emissions, increasing fuel efficiency, reducing maintenance costs, increasing useful life, and the like.

Furthermore, modern vehicles typically provide an on-board diagnostic interface, giving access to a wide variety of information. Various technologies have been developed for collecting and transmitting vehicle operation data, such as that available through an on-board diagnostic interface for remote processing. However, it is desirable to provide in-vehicle processing of vehicle operation data. Such in-vehicle processing would enable a wide-variety of driver mentoring and information capabilities.

SUMMARY

In one general aspect, a method for mentoring a vehicle operator includes receiving data indicative of vehicle operation by an operator, using the received data to identify behavior of a vehicle operator affecting wear or consumption of one or more vehicle consumables relative to baseline data, and mentoring the vehicle operator based on the identified behavior to reduce wear or consumption of one or more vehicle consumables. The data indicative of vehicle operation may be received through an on-board diagnostic interface. The data may include, for example, one or more of the following: acceleration; deceleration; engine coolant temperature; engine revolutions-per-minute; vehicle speed; throttle position; oxygen sensor readings; and topography measuring device. A topography measuring device is a device or sensor that measures and/or otherwise identifies the forward-looking/local topography with respect to the vehicle and/or its position.

This method may be used for a wide variety of mentoring and information display applications, including by way of example, mentoring systems to improve fuel consumption, to reduce brake pad wear, and mentoring systems to reduce wear or use of any consumables.

In another general aspect, a system for mentoring a driver of a vehicle includes a monitoring device in communication with an onboard diagnostics unit. The monitoring device receives one or more vehicle parameters from the onboard diagnostics unit, and uses such parameters to determine variation in vehicle operation from a baseline profile indicative of desirable vehicle operation. In this manner, the system can generate operator mentoring feedback to improve vehicle operation. Various vehicle parameters may be monitored, including one or more of the following: vehicle speed; fuel level; engine speed; load; mass air flow; manifold air pressure; and odometer reading. In this manner, a system may be provided to provide driver feedback regarding vehicle operation.

In another general aspect, a method for mentoring drivers to improve emissions of a vehicle includes monitoring one or more vehicle parameters, such as, for example, vehicle speed, fuel level, engine speed, load, mass air flow, manifold air pressure, and odometer reading, and using the received parameters to characterize emissions. Based on the emissions characterization, appropriate driver feedback may be generated.

DETAILED DESCRIPTION

Figure 1A:
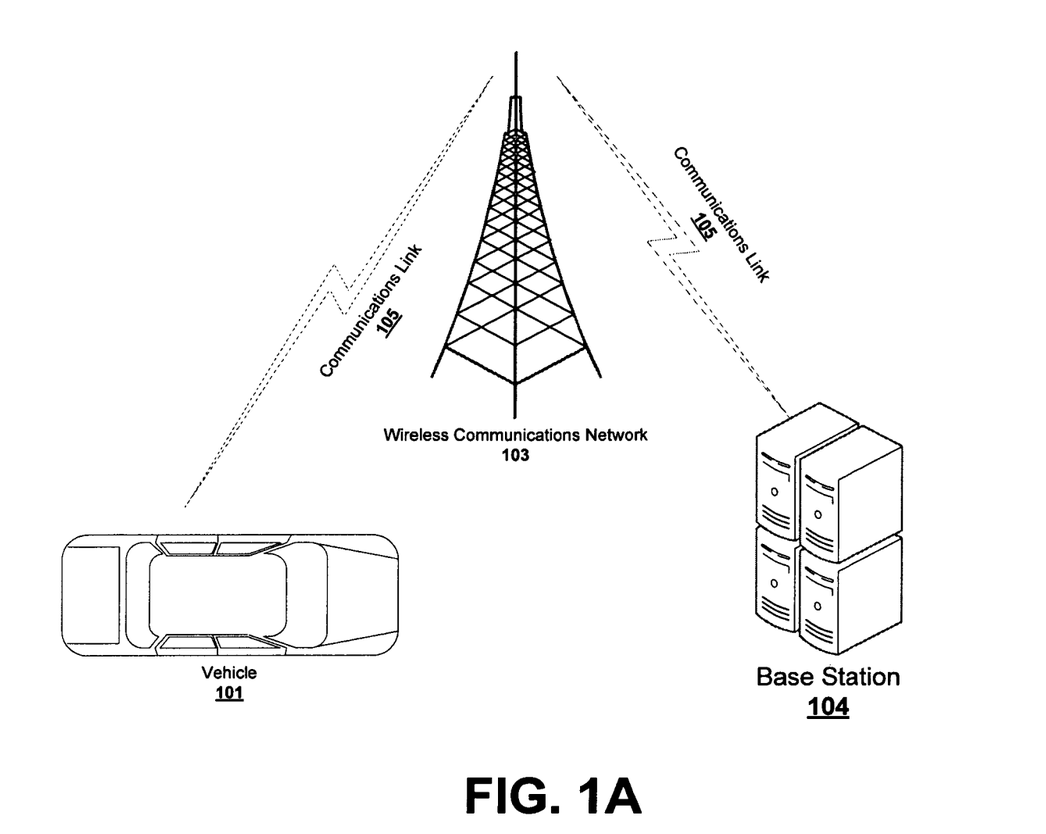
FIG. 1A is a diagram of a vehicle employing a system to improve driver behavior.
Figure 1B:
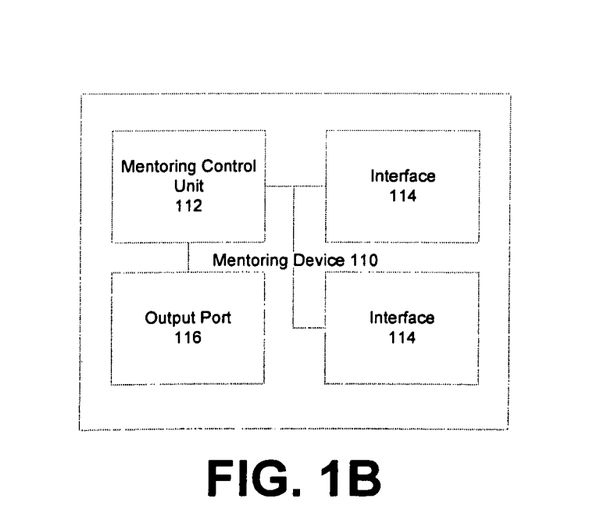
FIG. 1B is a block diagram of an in-vehicle device for use in a system to improve driver behavior.

Referring now to FIGS. 1A and 1B, a system for improving operating behavior includes a vehicle 101 in communication with a base station 104 via a wireless communications network 103. A mentoring device 110 placed in the vehicle 101 uses a mentoring control unit 112 in communication with one or more interfaces 114 to monitor vehicle operation and to provide information to an operator through one or more output devices 116 usable by the operator to improve behavior.

The technology described herein may be used with any vehicle including automobiles, trains, trucks, ships, motorcycles, and the like. One skilled in the art will appreciate that the mentoring device 110 may be implemented using any known technology. In the implementation shown in FIG. 1B, an embedded microcomputing device is used as a mentoring control unit 112 in communication with one or more interfaces 114. For example, an interface 114 is typically provided to facilitate data communication through an on-board diagnostic port. Additional interfaces may be desired to provide data capture and/or communications capabilities with any other vehicle systems, and with external communications networks.

The mentoring device 110 further includes one or more output ports 116 usable to provide information to a vehicle operator. For example, information may be provided to a vehicle operator using any audio, visual, and/or tactile feedback, or any combination thereof, including one or more of the following: (i) car stereo speakers; (ii) a dedicated speaker; (iii) a wireless headset; (iv) a mobile phone; (v) a dedicated display panel; (vi) an indicator light; or (vii) any other information communication technology now known or later developed.

In some implementations, an interface 114 enables communications over a wireless communications network 103 to enable, for example, communication with a remote base station 104. However, external communications is not required to implement operator mentoring technology described herein.

In one implementation, the monitoring device 110 is implemented as a vehicle monitoring system that may be used to evaluate and grade driver behavior, such as that described in U.S. patent application Ser. No. 11/755,556, filed on May 30, 2007, entitled "System and Method for Evaluating Driver Behavior," the disclosure of which is hereby incorporated by reference herein in its entirety. Another vehicle monitoring system that may be used to provide feedback and mentoring to a driver in order improve driver performance and driving behavior, is described in U.S. patent application Ser. No. 11/768,056, filed on Jun. 25, 2007, entitled "System and Method for Monitoring and Improving Driver Behavior," the disclosure of which is hereby incorporated by reference herein in its entirety. In the WaySmart™ System, driver behavior is monitored with the aid of an accelerometer module that includes at least one accelerometer for measuring at least one of lateral (sideways), longitudinal (forward and aft), and vertical acceleration in order to determine whether the driver is operating the vehicle in an unsafe or aggressive manner.

Figure 2:
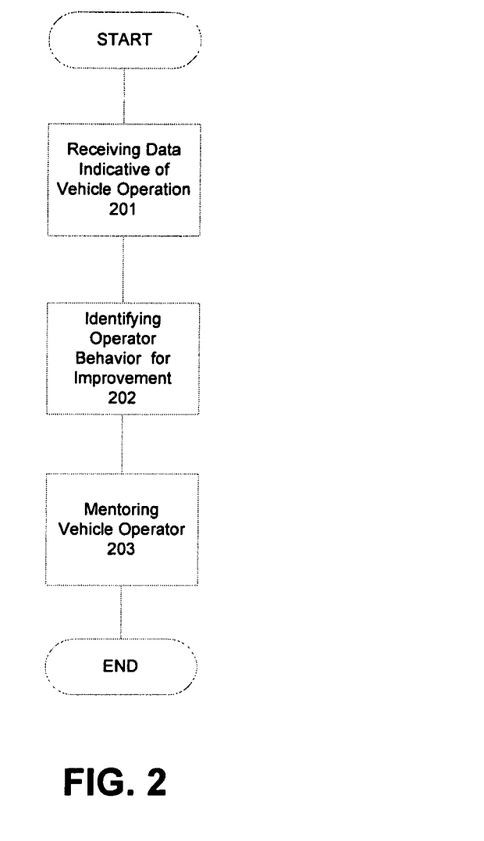
FIG. 2 is a flow chart of a method for improving driver behavior.

As shown in FIG. 2, a general method of mentoring is illustrated. In step 201, the mentoring device 110 receives data indicative of vehicle operation, for example, through interface 114. Data indicative of vehicle operation may be obtained through a vehicle 101 OBDII interface and other sources, such as those mentioned in the above mentoring patent applications. In step 202, the mentoring control unit 112 uses the received data to determine the driver's behavior. Specifically, the data can be used to determine if the driver is operating the vehicle in a non-optimal manner. In step 203, the mentoring control unit 112 provides the driver with mentoring to improve operator behavior. It is understood that some of the variables used to calculated load may include topographical and environmental factors.

The system and technology described above may be used to implement a vehicle operator mentoring system to assist operators in improving fuel efficiency. Improving fuel efficiency can improve safety by encouraging safe driving and can lower costs to the vehicle owner.

Figure 3:
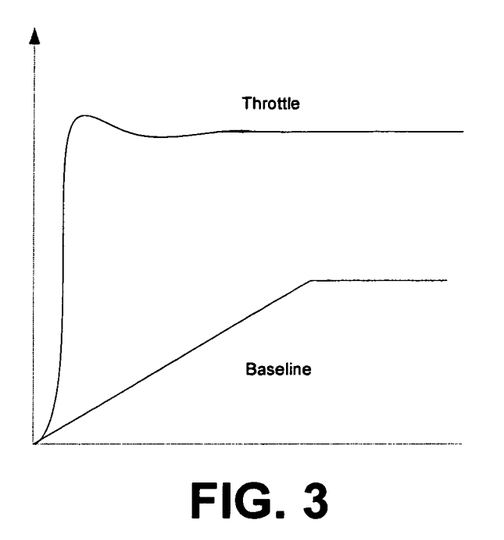
FIG. 3 is a graph depicting both measure throttle and baseline throttle in a fuel efficiency mentoring system.

Some automobiles provide information, such as, instantaneous or average fuel efficiency. However, this information alone fails to provide any mentoring feedback. With only instantaneous and/or average fuel efficiency, an operator has insufficient information to be able to determine whether his or her driving behavior should be modified, and whether modification could have a positive effect. A vehicle operator may be mentored regarding fuel efficiency in various ways. For example, operator behavior may be compared to a baseline model, such as shown in FIG. 3. Here, the measured throttle received through an OBD-II interface exceeds the baseline model for fuel efficient acceleration. When the mentoring control unit 110 determines non-optimal behavior, such as this, feedback is provided such that an operator may improve his or her behavior. For example, an indicator light may be activated indicating to the operator to reduce throttle, or an alert may be sounded. In this manner, the driver receives feedback and can modify his or her behavior to improve fuel efficiency.

Fuel efficiency can be calculated from information received from the OBD II, including vehicle speed, fuel level, engine speed, load, mass air flow, manifold air pressure, and odometer reading. Calculating fuel efficiency is known in the art. Over time, the driver can use a fuel efficiency display to change driving habits in order to increase fuel efficiency.

Additionally, the mentoring can include warnings when the driver lowers the fuel efficiency, such as by hard acceleration. While hard accelerations are occasionally useful, such as when entering freeways or in emergency situations, frequent or constant hard accelerations unnecessarily decrease fuel efficiency and increase wear and tear on the vehicle. Other examples of warnings that the driver is lowering fuel efficiency include:

Excessive idling, e.g., idling over three minutes at a drive through or parking lot Excessive speed, e.g., speed above 70 mph or 80 mph Frequent or constant hard braking, e.g., hard braking at all stop signs and stop lights The mentoring can also include signals to the driver when the driver increases fuel efficiency, such as by slow acceleration. Other examples of signals that the driver is increasing fuel efficiency include:

Long braking

Long coasting or driving with no acceleration

In some implementations, the mentoring device 110 is used to provide operator feedback related to vehicle emissions. The mentoring device 110, in communication with the OBD II, can also receive vehicle emissions information using data received from the OBD II. This information includes general and specific engine information, including malfunctions, e.g., the Check Engine light. Additionally, vehicle emissions can be monitored similarly to fuel efficiency.

The emissions monitoring and may also include mentoring, including providing information to the driver to instruct the driver how to decrease vehicle emissions. Decreasing emissions can improve safety by encouraging safe driving. The mentoring may be simply displaying the instant or long-term vehicle emissions to the driver. Over time, the driver can use a vehicle emissions display to change driving habits in order to decrease vehicle emissions.

Additionally, the mentoring can include warnings when the driver increases the vehicle emissions, such as by hard acceleration. While hard accelerations are occasionally useful, such as when entering freeways or in emergency situations, frequent or constant hard accelerations unnecessarily increase vehicle emissions and increase wear and tear on the vehicle. Other examples of warnings that the driver is increasing vehicle emissions include:

Excessive idling, e.g., idling over three minutes at a drive through or parking lot Excessive speed, e.g., speed above 70 mph or 80 mph Frequent or constant hard braking, e.g., hard braking at all stop signs and stop lights The mentoring can also include signals to the driver when the driver decreases vehicle emissions, such as by slow acceleration. Other examples of signals that the driver is decreasing vehicle emissions include:

Long braking

Long coasting or driving with no acceleration

In order to enhance reliability and extend its useful life, it is contemplated that the mentoring device 110 is housed in a sealable housing which may be configured to provide varying degrees of waterproof protection. For operation in extreme temperatures, a heater mechanism may be provided to the housing to enable reliable operation in cold and severe service environments. Ideally, the housing contents or the housing itself is configured to withstand excessive vibration and/or shock. The mentoring device 110 may be mounted in any location in the vehicle such as underneath the seat. The mentoring device 110 may further include an external power source, such as a battery, fuel cell, recharger, AC/DC adapter, DC bus connector (e.g. accessory or cigarette lighter plug), hot lead to vehicle fuse panel, etc., for powering the mentoring device 110.

In one embodiment, the vehicle monitoring system may further include a self-contained and tamper-resistant event data recorder or crash data recorder (CDR) similar to that which is shown and disclosed in U.S. Pat. Nos. 6,266,588 and 6,549,834 issued to McClellan et al., the disclosures of which are hereby incorporated by reference herein in their entirety, and which is commercially known as "Witness" and commercially available from Independent Witness, Inc. of Salt Lake City, Utah. The CDR is adapted to continuously monitor vehicle motion and begin recording upon supra-threshold impacts whereupon it records the magnitude and direction of accelerations or G-forces experienced by the vehicle as well as recording an acceleration time-history of the impact event and velocity change between pre- and post-impact for a configurable duration following said impact. The recordings are time-date stamped and are providable to the mentoring device 110 for subsequent transmission to the base station 104.

In addition, the CDR is configured such that data is downloadable such as via a laptop directly from the CDR at the scene of the accident or the CDR itself can be removed from the vehicle for later downloading of data. As will be described in greater detail below, the data (e.g., crash impulses) recorded by the CDR can be correlated to accident severity and injury potential. It is contemplated that CDR data can be combined with recording of driver behavior via the accelerometer module (XLM) in order to determine the probability of crash impact as a cause of personal injury and/or property damage.

Furthermore, the CDR, such as that disclosed in the McClellan references (U.S. Pat. Nos. 6,266,588 and 6,549,834), is Society of Automotive Engineers (SAE) J211-compliant such that data recorded thereby is admissible in court and can be used to facilitate accident reconstruction as well as for insurance claim purposes. As was earlier mentioned, the CDR is preferably a self-contained component that includes its own power source such as a battery such that the vehicle can operate regardless of the lack of power from the vehicle due to the accident.

The XLM may be integrated with the mentoring device 110 and mounted within the same housing. The XLM is operative to monitor driver performance by measuring vehicle acceleration in at least one of lateral, longitudinal and vertical directions over a predetermined time period such as over seconds or minutes. The XLM may include a single uni-axial accelerometer to measure acceleration in any one of the three above-mentioned directions such as in the lateral direction.

Alternatively, the accelerometer may be a bi-axial or a tri-axial accelerometer for measuring acceleration in two or three of the above-mentioned directions or two or three uni-axial accelerometers may be combined to provide measurements. In addition, accelerometers may be oriented in the XLM to measure centripetal, centrifugal, radial, tangential acceleration or acceleration in any other direction. The XLM generates an input signal to mentoring device 110 when measured acceleration exceeds a predetermined threshold. Similarly, the XLM may be configured to monitor and record both the day-to-day driving performance as well as capture the crash pulse. Advantageously, the base station 104 and/or the mentoring device 110 is configured to filter out or compensate for gravitational effects on longitudinal, lateral and vertical acceleration measurements when the vehicle 101 is moving on hilly terrain.

As was earlier noted, in one embodiment, the vehicle monitoring system includes a GPS receiver in each vehicle in the fleet and which is configured to track in at least one of real-time or over-time modes the location and directional movement of vehicle 101. As is well known in the art, signals from at least three GPS satellites must be received by a GPS receiver in order to calculate the latitude and longitude of an asset, such as vehicle 101, as well as allowing for tracking of vehicle movement by inferring speed and direction from positional changes. Signals from a fourth GPS satellite allow for calculating the elevation and, hence, vertical movement, of vehicle 101. The GPS receiver provides a GPS signal to monitoring device 110 which may also be transmitted to the server at the base station for recording.

In other embodiments, the vehicle monitoring system may further include a mobile data terminal (MDT), which may be conveniently mounted for observation and manipulation by the driver such as near the vehicle dash. The MDT preferably has an operator interface such as a keypad, keyboard, touch screen, display screen or any suitable user input device and may further include audio input capability such as a microphone to allow voice communications. Importantly, the MDT may include at least one warning mechanism, such as an external speaker and/or a warning light for warning the driver of violation of posted speed limits and/or exceeding acceleration thresholds in lateral, longitudinal and vertical directions as an indication of hard turns, hard braking or hard vertical, respectively. In addition, the MDT may include a manual RF disable switch to prevent RF emissions by the vehicle monitoring system in areas that are sensitive to RF energy.

The wireless communications network 103 may be provided by a variety of systems including, but not limited to, WiFi, cellular network, satellite, Bluetooth, infrared, ultrasound, short wave, microwave or any other suitable method. Hardwired communication may be effected at close range such as when vehicle 101 is within a service yard or at base station 104 wherein an Ethernet connection may be available.

Similarly, the techniques described herein may be used to mentor vehicle operators to reduce or extend the use of consumables other than fuel. For example, a baseline profile of driver behavior may be provided that is optimized to extend or reduce use of consumables such as the following: oil, transmission fluid, battery, brake pads, and the like.

In some implementations, various data elements may be estimated and used, for example, in various calculations, such as fuel efficiency. For example, vehicle load may be estimated based on various values such as, speed, throttle position, local topography (e.g., going up hill, down hill, level). Topography can be determined from stored map data, from a inclinometer, from sensor devices, and the like.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for mentoring a vehicle operator in a manner that assists the vehicle operator to understand whether vehicle operation is being performed in an optimal or non-optimal manner based on one or more parameters that relate to how the vehicle is being operated, comprising:
   detecting at one or more sensors installed in a vehicle one or more parameters from which data may be obtained that relate to how the vehicle is being operated, including one or more parameters in each of the following categories:
     parameters from which data is obtained that are indicative of wear or consumption of one or more vehicle consumables, including one or more of: acceleration, deceleration, engine coolant temperature, engine revolutions-per-minute, vehicle speed, throttle position, oxygen sensor readings, and local topography with respect to the vehicle;
     parameters from which data is obtained that are indicative of fuel consumption, including one or more of: vehicle speed, fuel level, engine speed, load, mass air flow, manifold air pressure and odometer reading; and
     parameters from which data is obtained that are indicative of vehicle emissions, including one or more of: vehicle speed, fuel level, engine speed, load, mass air flow, manifold air pressure and odometer reading;
   inputting the one or more sensed parameters to an on-board diagnostics unit installed in the vehicle;
   receiving at an on-board mentoring apparatus data from the on-board diagnostics unit that is obtained from the parameters input to the on-board diagnostics unit;
   storing baseline data in the on-board mentoring apparatus defining one or more desired profiles for operating the vehicle in a manner to improve vehicle operation, including at least baseline profile data corresponding to a desired fuel efficiency, a desired level of emissions and a desired level of wear or consumption of one or more vehicle consumables;
   at a processor of the on-board mentoring apparatus, processing the data received from the on-board diagnostics unit by comparing:
     the baseline profile data corresponding to the desired fuel efficiency with the data obtained that is indicative of fuel consumption, including one or more of: vehicle speed, fuel level, engine speed, load, mass air flow, manifold air pressure and odometer reading;
     the baseline profile data corresponding to the desired level of emissions with the data is obtained that is indicative of vehicle emissions, including one or more of: vehicle speed, fuel level, engine speed, load, mass air flow, manifold air pressure and odometer reading; and
     the baseline profile data corresponding to the desired level of wear or consumption of one or more vehicle consumables with the data obtained that is indicative of fuel consumption, including one or more of: acceleration, deceleration, engine coolant temperature, engine revolutions-per-minute, vehicle speed, throttle position, oxygen sensor readings, and local topography with respect to the vehicle; and
   notifying a driver of the vehicle as to whether the vehicle operation is optimal or not whenever said comparison indicates that vehicle operation does not meet any of the baseline profiles, so as to appropriately mentor the driver as to fuel efficiency, emissions and wear or consumption of one or more vehicle consumables.

2. The method of claim 1, wherein inputting the one or more parameters to the on-board diagnostics unit comprises inputting data corresponding to said one or more parameters through a vehicle bus interface.

3. The method of claim 2, wherein the vehicle bus interface is an onboard diagnostic (OBD) interface.

4. The method of claim 2, wherein the vehicle bus interface is a controller-area network (CAN) interface.

5. The method of claim 1, wherein the method further comprises inputting information to the on-board mentoring apparatus that identifies a date, time and a vehicle operator.

6. The method of claim 5, wherein the method further comprises the on-board mentoring apparatus storing at the on-board mentoring apparatus a record for later evaluation which represents date, time, vehicle operator and any detected non-optimal driving behavior for each notification that vehicle operation does not meet any of the baseline profiles provided to the driver by the on-board mentoring apparatus.

7. The method of claim 1, wherein the decrease in wear or consumption of one or more vehicle consumables comprises a decrease in brake pad wear.

8. A system for mentoring a vehicle operator in a manner that assists the vehicle operator to understand whether vehicle operation is being performed in an optimal or non-optimal manner based on one or more parameters that relate to how the vehicle is being operated, comprising:
   one or more sensors installed in a vehicle for detecting one or more one or more parameters from which data may be obtained that relate to how the vehicle is being operated, including one or more parameters in each of the following categories:
     parameters from which data is obtained that is indicative of wear or consumption of one or more vehicle consumables, including one or more of: acceleration, deceleration, engine coolant temperature, engine revolutions-per-minute, vehicle speed, throttle position, oxygen sensor readings, and local topography with respect to the vehicle;
     parameters from which data is obtained that is indicative of fuel consumption, including one or more of: vehicle speed, fuel level, engine speed, load, mass air flow, manifold air pressure and odometer reading; and
     parameters from which data is obtained that is indicative of vehicle emissions, including one or more of: vehicle speed, fuel level, engine speed, load, mass air flow, manifold air pressure and odometer reading;
   an on-board diagnostics unit that receives the sensed parameters;
   an on-board mentoring apparatus installed in the vehicle, said on-board mentoring apparatus comprising:
     a memory receiving from the on-board diagnostics unit data from that is obtained from the parameters input to the on-board diagnostics unit, and for storing baseline data defining one or more desired profiles for operating the vehicle in a manner to improve vehicle operation, including at least baseline profile data corresponding to improvement of fuel efficiency, reduction of emissions and a decrease in wear or consumption of one or more vehicle consumables; and a processor adapted to process the data received from the on-board diagnostics unit by comparing:

the baseline profile data corresponding to improvement of fuel efficiency with the data obtained that is indicative of fuel consumption, including one or more of: vehicle speed, fuel level, engine speed, load, mass air flow, manifold air pressure and odometer reading;

the baseline profile data corresponding to reduction of emissions with the data is obtained that is indicative of vehicle emissions, including one or more of: vehicle speed, fuel level, engine speed, load, mass air flow, manifold air pressure and odometer reading; and the baseline profile data corresponding to a decrease in wear or consumption of one or more vehicle consumables with the data obtained that is indicative of fuel consumption, including one or more of: acceleration, deceleration, engine coolant temperature, engine revolutions-per-minute, vehicle speed, throttle position, oxygen sensor readings, and local topography with respect to the vehicle; and one or more output devices for notifying a driver of the vehicle as to whether the vehicle operation is optimal or not whenever said comparison indicates that vehicle operation does not meet any of the baseline profiles, so as to appropriately mentor the driver as to fuel efficiency, emissions and wear or consumption of one or more vehicle consumables.

9. The system of claim 8, further comprising a vehicle bus interface through which the one or more parameters are input to the on-board diagnostics unit from said sensors.

10. The system of claim 9, wherein the vehicle bus interface is an onboard diagnostic (OBD) interface.

11. The system of claim 9, wherein the vehicle bus interface is a controller-area network (CAN) interface.

12. The system of claim 8, wherein the system further comprises an interface at the on-board mentoring apparatus for inputting information that identifies a date, time and a vehicle operator.

13. The system of claim 12, wherein the on-board mentoring apparatus stores a record for later evaluation which represents date, time, vehicle operator and any detected non-optimal driving behavior for each notification that vehicle operation does not meet any of the baseline profiles provided to the driver by the on-board mentoring apparatus.

14. The system of claim 8, wherein the decrease in wear or consumption of one or more vehicle consumables comprises a decrease in brake pad wear.

15. A computer program product consisting of a non-transitory computer readable medium containing computer-executable instructions for implementing a method for mentoring each vehicle operator in a manner that assists the vehicle operator to understand whether vehicle operation is being performed in an optimal or non-optimal manner based on one or more parameters that relate to how the vehicle is being operated, comprising:

receiving at an on-board diagnostics unit installed in a vehicle inputs from one or more sensors installed in the vehicle, the inputs comprising data that corresponds to one or more parameters from which data may be obtained that relate to how the vehicle is being operated, including one or more parameters in each of the following categories:

parameters from which data is obtained that is indicative of wear or consumption of one or more vehicle consumables, including one or more of: acceleration, deceleration, engine coolant temperature, engine revolutions-per-minute, vehicle speed, throttle position, oxygen sensor readings, and local topography with respect to the vehicle;

parameters from which data is obtained that is indicative of fuel consumption, including one or more of: vehicle speed, fuel level, engine speed, load, mass air flow, manifold air pressure and odometer reading; and parameters from which data is obtained that is indicative of vehicle emissions, including one or more of: vehicle speed, fuel level, engine speed, load, mass air flow, manifold air pressure and odometer reading;

receiving at an on-board mentoring apparatus data from the on-board diagnostics unit that is obtained from the parameters input to the on-board diagnostics unit;

storing baseline data in the on-board mentoring apparatus defining one or more desired profiles for operating the vehicle in a manner to improve vehicle operation, including at least baseline profile data corresponding to improvement of fuel efficiency, reduction of emissions and a decrease in wear or consumption of one or more vehicle consumables;

at a processor of the on-board mentoring apparatus, processing the data received from the on-board diagnostics unit by comparing the baseline profile data corresponding to improvement of fuel efficiency with the data obtained that is indicative of fuel consumption, including one or more of: vehicle speed, fuel level, engine speed, load, mass air flow, manifold air pressure and odometer reading;

the baseline profile data corresponding to reduction of emissions with the data is obtained that is indicative of vehicle emissions, including one or more of: vehicle speed, fuel level, engine speed, load, mass air flow, manifold air pressure and odometer reading; and the baseline profile data corresponding to a decrease in wear or consumption of one or more vehicle consumables with the data obtained that is indicative of fuel consumption, including one or more of: acceleration, deceleration, engine coolant temperature, engine revolutions-per-minute, vehicle speed, throttle position, oxygen sensor readings, and local topography with respect to the vehicle; and the on-board mentoring apparatus causing one or more output devices at the mobile data terminal to notify a driver of the vehicle as to whether the vehicle operation is optimal or not whenever said comparison indicates that vehicle operation does not meet any of the baseline profiles, so as to appropriately mentor the driver as to fuel efficiency, emissions and wear or consumption of one or more vehicle consumables.

16. The computer-readable medium of claim 15, wherein inputting the one or more parameters to the on-board diagnostics unit comprises inputting data corresponding to said one or more parameters through a vehicle bus interface.

17. The computer-readable medium of claim 15, wherein the method further comprises inputting information to the on-board mentoring apparatus that identifies a date, time and a vehicle operator.

18. The computer-readable medium of claim 17, wherein the method further comprises the on-board mentoring apparatus storing at the on-board mentoring apparatus a record for later evaluation which represents date, time, vehicle operator and any detected non-optimal driving behavior for each notification that vehicle operation does not meet any of the baseline profiles provided to the driver by the on-board mentoring apparatus.

19. The computer-readable medium of claim 15, wherein the decrease in wear or consumption of one or more vehicle consumables comprises a decrease in brake pad wear.

* * * * *